United States Patent
Piron et al.

(10) Patent No.: US 11,128,897 B2
(45) Date of Patent: Sep. 21, 2021

(54) METHOD FOR INITIATING A TRANSMISSION OF A STREAMING CONTENT DELIVERED TO A CLIENT DEVICE AND ACCESS POINT FOR IMPLEMENTING THIS METHOD

(71) Applicant: NAGRAVISION S.A., Cheseaux-sur-Lausanne (CH)

(72) Inventors: Laurent Piron, Aigle (CH); Frederic Thomas, Onex (CH); Martin Gibson, Saratoga, CA (US)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 0 days.

(21) Appl. No.: 16/866,085

(22) Filed: May 4, 2020

(65) Prior Publication Data
US 2020/0267423 A1 Aug. 20, 2020

Related U.S. Application Data

(63) Continuation of application No. 15/573,618, filed as application No. PCT/EP2016/061629 on May 24, 2016, now abandoned.

(30) Foreign Application Priority Data

May 29, 2015 (EP) .................................. 15169830

(51) Int. Cl.
*H04N 7/173* (2011.01)
*H04N 21/2343* (2011.01)
*H04L 29/06* (2006.01)
(Continued)

(52) U.S. Cl.
CPC ....... *H04N 21/2343* (2013.01); *H04L 65/105* (2013.01); *H04L 65/1089* (2013.01);
(Continued)

(58) Field of Classification Search
CPC ......... H04N 21/44016; H04N 21/8455; H04N 21/8456; H04N 21/2181
(Continued)

(56) References Cited

U.S. PATENT DOCUMENTS 8,213,779 B2 * 7/2012 Crinon ............. H04N 21/44016
386/344
2007/0067480 A1 3/2007 Beek et al.
(Continued)

FOREIGN PATENT DOCUMENTS

WO WO 2014/204366 12/2014

OTHER PUBLICATIONS

International Search Report Issued in International Application No. PCT/EP2016/061629 dated Jul. 7, 2016.
Written Opinion Issued in International Application No. PCT/EP2016/061629 dated Jul. 7, 2016.

*Primary Examiner* — Jivka A Rabovianski
(74) *Attorney, Agent, or Firm* — Oblon, McClelland, Maier & Neustadt, L.L.P.

(57) ABSTRACT

A method for initiating a transmission of a program stream for delivery from a local access point to a client device, said program stream being structured as a plurality of regular segments relating to a single event. This method comprises the steps of: (a) processing at least one of the regular segments into a set of particular segments, where the at least one regular segment carries a payload of a first playback duration and the payload of said set represents a second playback duration that is greater than that of the first playback duration, and where the second playback duration is sufficient to comply with a client device requirement for initiating a rendering of the event, and (b) transmitting, during an initial period, from the local access point said set of particular segments.

17 Claims, 3 Drawing Sheets

(51) Int. Cl.
   *H04N 21/845* (2011.01)
   *H04N 21/236* (2011.01)
(52) U.S. Cl.
   CPC ...... *H04L 65/4069* (2013.01); *H04L 65/4084* (2013.01); *H04L 65/4092* (2013.01); *H04L 65/605* (2013.01); *H04L 65/607* (2013.01); *H04L 65/80* (2013.01); *H04N 21/23439* (2013.01); *H04N 21/23608* (2013.01); *H04N 21/234381* (2013.01); *H04N 21/8456* (2013.01)
(58) Field of Classification Search
   USPC .......................................................... 725/86
   See application file for complete search history.

(56) References Cited

U.S. PATENT DOCUMENTS

| | | |
|---|---|---|
| 2009/0110371 A1 | 4/2009 | Akimoto |
| 2011/0055328 A1 | 3/2011 | Lahr |
| 2013/0212222 A1 | 8/2013 | Outlaw |
| 2014/0036999 A1 | 2/2014 | Ryu |
| 2014/0149539 A1 | 5/2014 | MacInnis |
| 2015/0026310 A1 | 1/2015 | Outlaw |
| 2015/0215359 A1 | 7/2015 | Bao |
| 2015/0289003 A1* | 10/2015 | Huber ................ H04N 21/8456 725/116 |
| 2016/0142750 A1 | 5/2016 | Huber et al. |

* cited by examiner

METHOD FOR INITIATING A TRANSMISSION OF A STREAMING CONTENT DELIVERED TO A CLIENT DEVICE AND ACCESS POINT FOR IMPLEMENTING THIS METHOD

CROSS-REFERENCE TO RELATED APPLICATIONS

This is a continuation of U.S. application Ser. No. 15/573,618, filed Nov. 13, 2017, which is a continuation of PCT/EP2016/061629, filed May 24, 2016, which is based upon and claims the benefit of priority from the prior European Patent Application No. 15169830.5 filed May 29, 2015. The entire contents of each of these documents are incorporated herein by reference.

TECHNICAL FIELD

The field of this disclosure relates to streaming live or recorded multimedia content.

BACKGROUND

Streaming multimedia content involves the transmission and playback of audio and/or video digital data files that are received on a continuous basis for rendering purposes. The media content typically relates to a discrete event such as a movie, a sporting event, a program episode, a documentary, a song, a speech, or a podcast. The media content related to an event is typically transmitted in a program stream, which may be regarded as being a container carrying the data related to the event. A program stream usually (but not necessarily) includes different kinds of data, such as one or several audio streams, a video stream and metadata that are interleaved together by a multiplexing process to create a program stream for a given event. All data within such a program stream relates to a single event. By contrast, a transport stream may be regarded as being a bigger container suitable for simultaneously carrying several program streams for different events.

The program stream can be broadcasted or provided on demand by a streaming server, e.g. a head-end, to a client device via a local access point, such as a gateway, linking the client device to the streaming server. The data transmission is generally carried out through a communication network to which the local access point is connected. The streaming server can be considered to be a media server which is remote from a local environment (home or business environment). The local environment includes the local access point and the client device. The client device may include a rendering device or it may be connectable to an external rendering device, such as a display screen or an audio speaker. The client device could be a media player, a personal computer, a smart phone, a personal tablet computer or a set-top-box.

The program stream is continuously transmitted by the streaming server in order to supply the client device through the local access point. The local access point is configured to adapt the program stream according to the rendering capabilities of the client device or to provide access to the streaming network, especially in circumstances where the client device is not adapted to perform these functions. The program stream is provided by the local access point to the client device under a streaming protocol. For convenience, such a protocol is based on fragmentation of the program stream so as to form a sequence of segments (chunks). To this end, the local access point fragments the program stream into segments. Preparing these segments is performed in real time, after the end user requested them. An example of a streaming protocol is HTTP Live Streaming (also known as HLS), which works by splitting the program stream into a sequence of short content files. Each of these content files can be regarded as being a container containing a segment of the program stream in an encoded form. Accordingly, each segment comprises an encoded portion of a single event. As each segment may further comprise other data such as an identifier within a header, the encoded portion relating to the event more specifically refers to the payload of the segment.

Each content file is referenced within at least one index file which is known as playlist or manifest file. The index file provides at least the URL (Uniform Resource Locator) of each content file. Once the index file is obtained by the media player, the latter is able to successively download a content file that makes up a portion of the event and play the content of this content file. Dynamic Adaptive Streaming over HTTP (DASH), also known as MPEG-DASH, is an adaptive bitrate streaming technique that works in a similar manner to HLS-based solutions. Also based on a playlist and content file, MPEG-DASH techniques are disclosed in patent application publication US 201010169303.

Live streaming refers to content created and transmitted in real-time. This occurs for instance when a video camera (e.g. a webcam) captures images which are then encoded before being transmitted or broadcast through a communication network such as the Internet. On the other hand, in a non real-time context occurring for example when broadcasting a time-shifted TV program, images are first collected by the streaming server and then transmitted at a later time.

In order to playback images contained in one video content file, the client device must first download this content file. The client device cannot process the content file as long as it is not fully downloaded. Further, some media players are configured to buffer more than one content file before releasing the related content. Buffering of several content files appears to be very useful to smooth out short-term variation in the content file arrival times typically caused by network bandwidth variations or streaming server congestion. Taking into account that the payload of each segment represents a playback duration in the order of several seconds (typically between 2 and 10 seconds), buffering three segments for example, may provide a playback reserve of up to 6 to 30 seconds. Accordingly, buffering of a sufficient amount of data allows for certain disturbances such as short-term freezing of images during the playback of audio/video content to be avoided. In addition, the local access point also needs to acquire the content before being able to deliver it to the client device. Thus, an extra delay is added by the local access point due to having to tune to the right content and to prepare its delivery to the client device. Typically 2 to 5 seconds can therefore be added.

A drawback results from buffering data as described above in that there may be a significant lapse of time between the moment a user requests an event and the moment the first data related to the event is played on the rendering device. Indeed, during this time interval, the end user has to wait until the buffering of the content files is completed before the payload of the segment contained in the first content file can be played on the rendering device. Depending on the length of the segment, the required time for filling the buffer of the client device may be significant, in particular for live streaming. Indeed, in the case where the payload of each segment represents a playback of 10 seconds and the buffer is sized for buffering at least three of such segments, the end user will wait up to roughly 30 seconds before the first image of the live content is displayed. During the waiting time required for filling the buffer, the display screen remains black, to the user's dissatisfaction.

This technical problem occurs when the end user turns on his media player to get a streaming content as well as when the end user switches from a first streaming event to a second streaming event (e.g. when zapping/surfing/switching between channels).

To reduce the zapping time, it has been suggested to guess the next probable channel(s) that the end user could switch to in order to simultaneously acquired data relating to said probable channel(s). However, such a solution is only suitable if the local access point has sufficient resources for offering this service to every client device in the home or business environment, which is very unlikely especially since content adaptation (e.g. transcoding) requires significant resources on the part of the local access point, in particular resources that the local access point may not necessarily have.

Document WO 2012/094363 addresses a problem wherein the manifest file (playlist) is usually only made available to the client device once at least a minimum of video segments have been buffered and their payload is ready to be played. To reduce the latency caused by this buffering time, it is suggested that the manifest file be made available in advance, i.e. before the minimum of video segments to be buffered have actually been buffered. Accordingly, the client device is able to playback the payload of the first segment of the event before the minimum number of segment has been buffered.

Although this solution is relevant for some media players, it remains inefficient for certain other media players due to unique configurations imposed by the manufacturers. Indeed, some client devices are designed to authorize the playback of the payload of the first segment once at least a pre-determined number of segments have been duly buffered in their buffer. For instance, in order to get a sufficient playback reserve, some media players are configured to buffer at least three segments before triggering the rendering of the event by the playback of the payload of the first buffered segment. Unfortunately, the end users of these preconfigured media players have no alternative and must wait until the required number of segments has been actually buffered. Accordingly, there is a need to provide a global solution, namely a solution that is suitable for any client device. Such a solution must reduce the content buffering latency which occurs when the client device is turned on, as well as when the device switches from one program stream to another, while complying with the configuration imposed by the client device manufacturer in terms of minimal number of segments or playback time reserve to be buffered.

Preferably, such a solution must reduce said buffering latency, while successively constituting a playback reserve by buffering as many segments or as much playback time as required by the client device, so as to comply with the configuration imposed by the manufacturer.

SUMMARY

A solution allowing for an enhanced rendering experience, while complying with the specifications of the client device regarding the number of segments that must first be buffered, provides a particular way to allow for the required number of segments, or the required playback time reserve, to be buffered while also reducing the time interval during which no content is played.

This solution is accomplished by generating, from at least one regular segment that is usually released by a local access point, a set of particular segments that provides a longer playback time interval than the regular segment. Preferably, the longer playback time interval is sufficient to comply with the client device prerequisite requirement for initiating a rendering of the event. Regarding an audio and/or visual experience, the end user may appreciate the faster start of the rendering of the event, although the first few seconds of the rendering of this event will seem to be played at a slower rate. Accordingly, the solution takes into account the experience of the end user rather than focusing on actual hardware performance for properly achieving the rendering of the event when the client device is turned on or when it is switched from one program stream to another. Since the end user is in any case more satisfied by a slower rate of video playback during an acceptable transition time interval than being presented with a black screen over the same time interval, this solution provides an enhancement of the visual experience during critical times.

More specifically, there is disclosed a method for initiating a transmission of a streaming content to be delivered to a client device, for example by an access point, in particular a local access point such as a gateway for example. This streaming content is structured into a plurality of segments (regular segments) which together relate to a single event. Each of these segments carries a payload providing a rendering experience of a first playback duration. In other words, each of these segments represents a first playback time interval, in particular when the payload contained in each of these segments is played back by the client device at a nominal speed. The method comprises the steps of:
    processing at least one of the regular segments into a set of particular segments where the payload of said set represents a second playback duration greater than that of the first playback duration,
    transmitting, during an initial period, from the local access point said set of particular segments.

The client device is configured such that a pre-determined number of segments must first be buffered before initiation of the playback of the event is allowed. As each segment represents certain playback duration, the client device can be regarded as being configured such that as pre-determined playback duration must first be buffered before initiation of the playback of the event is allowed.

Preferably, the duration of the set of particular segments is expanded relative to the regular segment or segments on which the set of particular segments is based in a way that reduces the frequency at which information changes during rendering of the particular segments. With respect to video, this reduction in rate of information change will result in the appearance of slow motion or brief pauses of video. With respect to audio, the reduction in the rate of information change will be perceived as downward shift in frequency of the audio information (e.g., a human voice will be deeper) or stutter.

Moreover, the aforementioned processing step is started during the initial buffering period, i.e. the early stages of the transmission of the event, during a pre-processing operation. More specifically, this pre-processing operation is performed on the streaming content at least once for "substituting" a set of particular segments for least one regular segment.

During the pre-processing operation, several techniques may be used to extend the first playback duration (that the payload of a regular segment represents) into a second playback duration (that the payload contained in the related set of particular segments represents). These techniques may involve:

- modifying one or several timestamps used for determining the moment when the payload of a regular segment (or one or several portions of its payload) must be played back,
- applying a slowdown factor to such a timestamp instead of modifying it,
- modifying the payload of a regular segment by duplicating some elementary entities constituting this payload, said elementary entities being audio or video frames of the related media content,
- modifying the payload of a regular segment by adding at least one of such elementary entities, e.g. by adding interpolated audio and/or video frames,
- providing an instruction to force one or more re-plays of one or more of elementary entities (without modifying the payload of the segment).

The solution also comprises a system for implementing the above-mentioned method, together with several related embodiments.

Finally, the solution also comprises an access point (more specifically a local access point) that supports coupling a client device, for initiating the transmission of the streaming content, usable for the implementation of the related method and system disclosed in the present description.

As a result of the solution, the rendering of the event supplied through the streaming content can start earlier, in particular with regard to client device prerequisite requirements for initiating the rendering of the event. Such requirements may relate to a pre-defined number of segments (or content files), or a pre-defined playback duration, that must be first buffered before playback of the event may begin.

Other advantages and embodiments will be presented in the following detailed description.

BRIEF DESCRIPTION OF THE DRAWINGS

The following detailed description will be better understood with reference to the attached figures in which.

DETAILED DESCRIPTION

Figure 1:
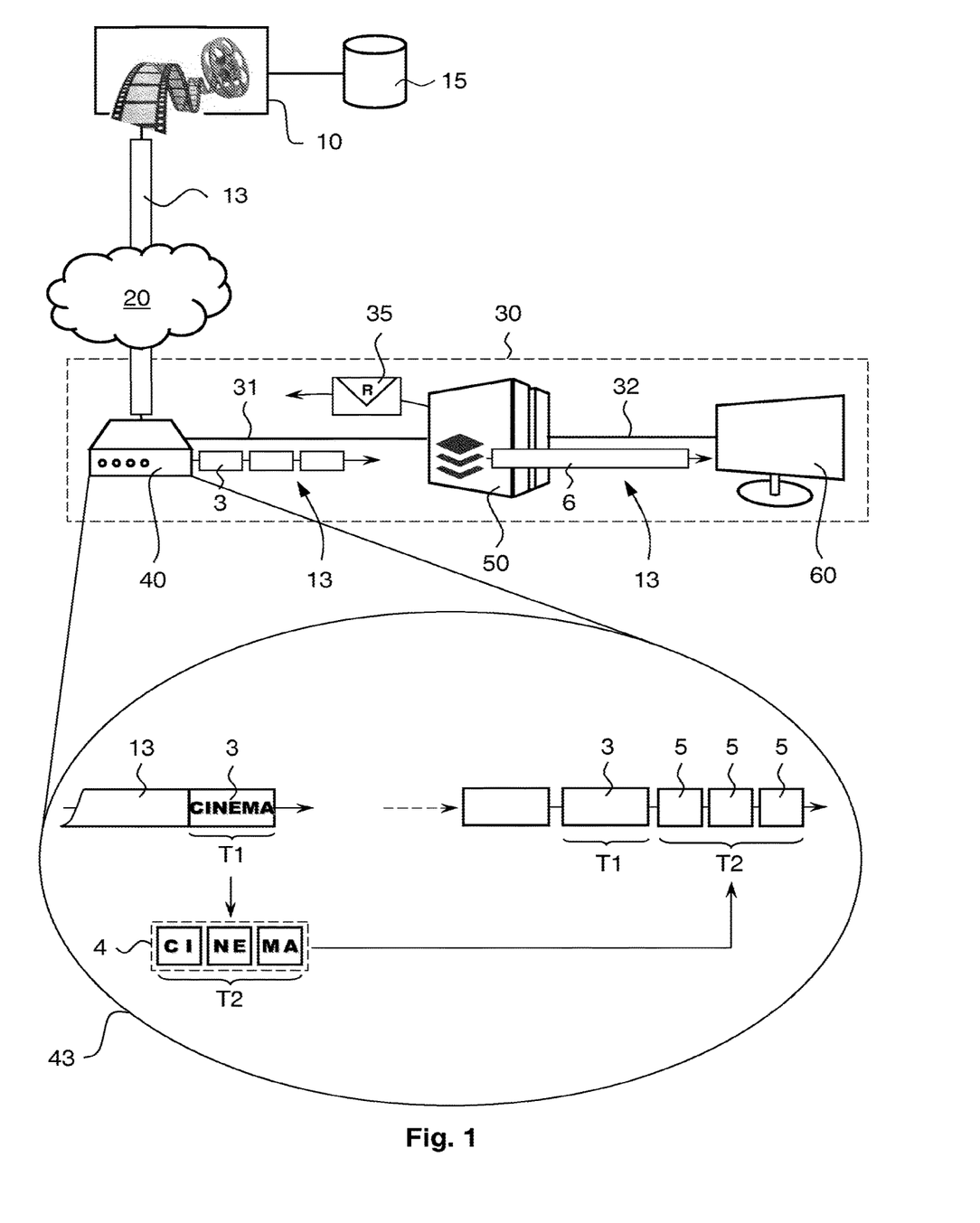
FIG. 1 schematically depicts an architectural overview of a system within which embodiments may be deployed.

FIG. 1 schematically shows an overview of a system comprising three main interconnected areas, namely a content provider 10, a communication network 20, and a home or business area 30. The content provider 10 may refer to a remote streaming server or a head-end suitable for delivering streaming content 13. To this end, the content provider 10 can include a database 15 or can be connected to such a database as shown in FIG. 1. The database 15 may be used for storing media content which could be requested by clients in a video-on-demand (VOD) context for example, or which could be broadcast in an Internet Protocol Television (IPTV) system for example.

Typically, the communication network 20 is a wide area network such as a Satellite network, a Cable broadcast network, the Internet or any other kind of network. This communication network is used to link the content provider environment to the home or business area which hereinafter is referred to home area 30.

The home area 30 comprises a local access point 40 (e.g. a gateway), a client device 50 and a rendering device 60. Of course, this home area may include more than one client device, which can be connected or interconnected through a local communication network, such as a LAN or a WLAN (Wireless Local Area Network). More specifically, the client device 50 is connectable to the local access point 40 by a first communication link 31 and, if any, could be further connectable to a rendering device 60 by a second communication link 32. The local access point 40 acts as an interface for connecting the home area 30 to the wide communication network 20. The client device 50, can be represented for instance by a personal computer, a smart phone, a personal tablet computer, a set-top-box or any other media player. The rendering device 60 is typically a display screen and/or an audio rendering system such as speakers.

The streaming content 13 relates to media content such as audio and/or video content (e.g., a program stream) that is transmitted on a continuous basis to the client device 50 for instantaneous or nearly instantaneous rendering. This content relates to a single event, for instance a movie, a television or radio program of a TV or radio channel, a video, a podcast, a music album or a song. In the following description, the streaming content will refer to a video content taken as a non-limitative example. For the purposes of convenience, the streaming content is structured as a plurality of segments 3 by the local access point 40. Such segmentation is compliant with a streaming protocol, such as HLS or any other suitable protocol. According to some protocols, such segments are referred to as a content file and can be advantageously processed as any common data file by numerous client devices.

Each segment is configured for carrying a chunk of the event. A chunk is a portion that represents a short time interval of the event. This portion is known as the payload of the segment, because in front of this payload, the segment generally further comprises a header. Such a header is used for identifying the segment to which it belongs and it can also be used for carrying other data, such as one or two timing references. By successively arranging all of the segments of a single event in an ordered manner, according to their identifier, such an event can be easily reconstructed.

Assuming that the streaming content refers to a visual content, the payload of each segment is made of a succession of pictures, each picture being known as a frame by the person skilled in the art. Each of these frames further comprises a frame-header defining the coding type of the frame. More specifically, each segment begins with an IDR (Instantaneous Decoder Refresh) coded picture.

Referring for example to the MPEG format, the frame-header defines whether the frame relates to an I-frame (Intra coded picture), a P-frame (predictive coded picture) or a B-frame (bipredictive coded picture). The frames of an encoded video stream are grouped in Group Of Pictures (GOP), each GOP having its own GOP-header. A GOP is a short sequence of about 6 to 15 frames arranged in a specific manner. For instance, a GOP can be represented by a sequence of the following 12 frames: I1-B2-B3-P4-B5-B5-P?-BB-B9-P10-B11-B12.

I-frames correspond to reference pictures, so that the entire data (i.e. pixels) regarding such a picture is transmitted in the video stream. By contrast, B-frames and P-frames can be determined on the basis of some data defining what has been changed from one frame to another and how these changes occurred. Accordingly, the sequence of B-frames and P-frames belonging to a same GOP can be calculated on the basis of:

the I-frame of this GOP,
related complementary data, and
former calculated P-frame of this GOP, if any.

The above-mentioned complementary data includes motion vectors which define how certain areas of a picture have moved from one frame to another.

Given that the computation of P-frames and B-frames depends on at least one previous frame (I-frame and/or P-frame), it should be noted that the frames of a GOP are not decoded in the same order as that in which they are presented. Therefore there is a need to identify in which order the frames must be successively decoded. To this end, a first timestamp, known as a Decoding Time Stamp (DTS), is used for determining when each frame must be decoded, and a second timestamp, known as a Presentation Time Stamp (PTS), is used for determining when these frames must be presented.

In accordance with such a program stream structure, each segment carries a payload representing a certain time interval when the payload is played back by the client device at a nominal speed (i.e. at a normal speed). The time interval is not necessarily the same for each segment. This time interval will be identified as first playback duration T1 in the present description.

Now, the steps embodiments of a method for initiating transmission of a program stream will be explained in more detail. It should be noted that some steps are optional and have been mentioned in a particular embodiment to allow a better understanding of the method.

As a first step, a request 35 for receiving a specific program stream is generated. Generating such a request can be performed by the user, typically by pressing a button on a remote control 56 (FIG. 3), by selecting a URL or by clicking on a button or hyperlink displayed on the screen of a personal computer, a tablet computer, a smart phone or any similar device. The request can be generated when the end user wants to get a media content for the first time during a session, for instance just after having turned on the media player. Alternatively, the request can be generated when the user wants to switch from a first media content currently being played back to a second media content. This situation occurs when the user zaps (surfs or switches) between several media contents for example. This request can include data to identify the requested content or other information, e.g. information for identifying the client device or a specific bitrate (or a video resolution) suitable for downloading the content.

Once this request 35 has been generated, it is sent to the local access point 40 as shown in FIG. 1. Then the local access point selects the requested program stream. In the present description, the local access point can be a gateway taken as a non-limiting example. Accordingly, another entity could be used instead of such a gateway.

Depending on the encoding format, the local access point 40 may have to transcode the input program stream 13 into a coding format compatible with the client device. Such a format conversion may be performed by a transcoder 44 (FIG. 4) in the local access point 40. After the content has been decoded and before it is encoded again by the transcoder, the content appears in a raw format.

Once the media content is in a suitable coding format and has been fragmented into segments 3, the local access point 40 can initiate the transmission of the program stream 13 to the client device 50. The latter buffers a pre-determined number of segments 3 in a buffer 53 located within the client device before starting playback of the event. This pre-determined number of segments 3 depends on the specification of the client device 50, in particular it depends on the configuration imposed by the manufacturer. Indeed, some client devices 50 are designed to authorize the playback of the payload of the first segment once at least a pre-determined number of segments have been duly buffered in their buffer, or once at least a pre-determined duration has been duly buffered in their buffer. For instance, in order to get a sufficient playback reserve, some media players are configured to buffer at least three segments (or at least a certain time duration corresponding to such a number of segments, e.g. 30 seconds) before triggering the rendering of the event by the playback of the payload of the first buffered segment. It should be understood that such a prerequisite cannot be changed and defines the client device requirement for initiating a rendering of the event.

As soon as the required number of segments has been buffered (i.e. the pre-determined number of segments), the client device 50 triggers the rendering of the program stream, for instance through the communication link 32, towards the rendering device 60. This content 6 may be supplied to the rendering device 60 in accordance with a further format, so that the form of the content which is input in the client device may be different from that of the content which is output from the client device.

At the same time as the rendering is being performed, further successive segments relating to the current event are buffered in a continuous manner so as to ensure the regular playback of their payload until the end of the event.

Before starting the playback of the frames contained in the first segments, the buffer must be loaded until a predetermined level is reached. Such a buffering operation takes a certain amount of time, which is referred to as a first buffering period. Several parameters influence the first buffering period. For example, the first parameter could be the amount of data contained in a segment 3. Several factors may influence the amount of data, including but not limited to the data compression rate, the resolution of the data and/or the first playback duration T1. Usually, all the segments provide (almost) the same first playback duration, however it should be noted that this is not imperative.

In order to provide improved user satisfaction during the playback of the program stream, several segments are buffered before starting playback. Generally speaking, at least two or three segments could be buffered. For instance, loading a buffer with at least three segments allows for a large enough amount of data to be prepared thus enabling the media player to overcome any perturbations (bitrate variations) which may occur during the downloading the program stream.

Sometimes, the number of segments or the playback duration to be buffered before triggering the playback of the program stream cannot be changed or by-passed since it is part of a prerequisite defined by the manufacturer of the client device. Accordingly, the end user has no other choice but to wait for the buffering of the pre-requisite number of segments, or the buffering of the pre-requisite playback duration, by the client device before being allowed to start enjoying the related event. In particular when the program stream is transmitted live from the content provider, the first buffering period can represent a long time interval, typically 20-30 seconds. To overcome this drawback, the techniques discussed herein allow the requirements of the client device to be complied with more quickly.

To this end, the method comprises the steps of:
processing at least one of the regular segments 3 into a set 4 of particular segments 5 where the at least one regular segment 3 carries a payload of a first playback duration T1 and the payload of this set 4 represents a second playback duration T2 that is greater than that of the first playback duration T1, and where the second playback duration T2 is sufficient to comply with a client device requirement for initiating a rendering of the event, then transmitting, during an initial period, from the local access point 40 this set 4 of particular segments 5.

More specifically and according to one embodiment, a method is provided whereby the local access point 40 performs a pre-processing operation, during which a set 4 of particular segments 5 is delivered instead of one or more regular segments 3 usually provided at the output of a local access point. Such a pre-processing operation 43 is illustrated in the lower part of FIG. 1 (see detail of local access point 1). To this end, the local access point generates a set 4 of particular segments 5 from each one or more regular segments 3.

As shown by way of example in FIG. 1, the local access point takes the first regular segment 3 and creates three particular segments 5. The number of particular segments 5 made from one regular segment 3 can be different from three, for instance two, four or five. In addition, each of the particular segments 5 will preferably have an equal length, namely a same playback duration. Nevertheless, the local access point could also generate, from one regular segment, several particular segments, each with a different playback duration.

In any event, the set 4 of particular segments will represent a second playback duration T2 which is greater than the first playback duration T1 of the regular segment 3 from which the particular segments 5 have been generated. Referring to FIG. 1, one can see that the first playback duration T1 of the segment 3 containing the payload "CINEMA" is shorter than the second playback duration T2 of the set 4 containing an equivalent payload divided into three particular segments 5. By extending the first playback duration T1 to the second playback duration T2, the client device prerequisite requirement for initiating the rendering of the event will be met more quickly than waiting for buffering only regular segments 3 until a required playback duration has been buffered. The same is true by directly providing a required number of particular segments 5 to meet the client device prerequisite requirement, instead of waiting until the required number of regular segments 3 has been buffered.

As schematically illustrated in FIG. 1, preferably the payload carried by the set 4 of particular segments 5 represents an equivalent information content as that of the payload carried by the related regular segment 3. In other words, and referring to a movie as an example of the event of the streaming content 13, the set 4 of particular segments 5 will provide the same scene to the end user as that of the regular segment 3 which has been used as source for generating the particular segments 5. This is schematically illustrated in FIG. 1 by showing that the frames incorporating the letters "C" and "A", at the two ends of the regular segment 3 carrying the word "CINEMA" as payload, are also located in the two ends of the set 4 of particular segments.

The payload carried by the set 4 can be identical or different to that of the regular segment 3. For instance, the payload carried by all of the particular segments of the set 4 may comprise more frames than the payload of the related regular segment 3. The added frames do not relate to a different scene but could relate to some interpolated frames.

It should be also noted that the particular segments 5 of the set 4 are arranged in a chronological order, so as to maintain an equivalent rendering as that of the regular segment 3. In other words, and still referring to the payload "CINEMA" included in the regular segment 3, the related particular segments 5 are arranged in an orderly manner so as to provide the same sequence as that provided by the related regular segment 3. Accordingly, the particular segments 5 will be organized to provide in the first place the payload "CI", then to provide the payload "NE" and finally the payload "MA".

The pre-processing operation 43 can be performed e.g. after the content has been decoded and before it is encoded again by the transcoder of the local access point. Indeed, as the content appears in a raw format during this time interval, it is advantageous to perform some modifications on this content at this time.

In all cases, the preprocessing operation will be started during the aforementioned first buffering period. Preferably, the pre-processing operation is applied to the first regular segment 3 which would have been provided by the local access point 40.

Accordingly, the pre-processing operation 43 can be ended as soon as the predefined number of segments required by the client device is obtained. The client device is unable to make any distinction between a regular segment 3 and a particular segment 5, therefore the predefined number of segments pre-processed by the local access point may include either regular segments or particular segments or a mixture of both. Accordingly, both the regular segments 3 and the particular segments 5 have the same structure and are processed in the same manner by the client device. This also means, for example, that if the client device is configured to buffer at least three segments during the first buffering period, the local access point will be preferably configured to generate three particular segments from a single regular segment, but it could also be configured to generate a different number of particular segments. For instance, it could generate four or five particular segments or even only two particular segments. In this latter case, the client device has to buffer these two particular segments and the next regular segment so as to buffer the required number of segments of the event before starting with its rendering. Preferably, the set 4 will comprise at least as many particular segments as the predetermined number of segments required by the client device (typically defined by the manufacturer).

As soon as the local access point 40 has generated the particular segments 5, these are transmitted to the client device 50, in a single block. Alternatively, the particular segments 5 are transmitted to the client device 50 segment by segment, preferably as soon as a particular segment 5 is ready to be sent, the local access point triggers its transmission towards the client device.

The pre-processing operation 43 is started during the first buffering period, preferably just after having buffered some content. More specifically, this pre-processing operation is performed on the streaming content at least once. Finally, the last step of this pre-processing operation is to deliver the particular segments from the local access point to the client device, preferably as soon as they are generated.

Once the required number of segments of the event has been duly placed in the buffer of the client device or once the playback duration represented by this required number of segments has been buffered, these segments (i.e. the regular segments 3 and/or the particular segments 5) are released by the client device for rendering purposes. Referring to FIG. 1, such a release is shown by the stream of content 6 transmitted from the client device 50 towards the rendering device 60 through the communication link 32.

Figure 2:
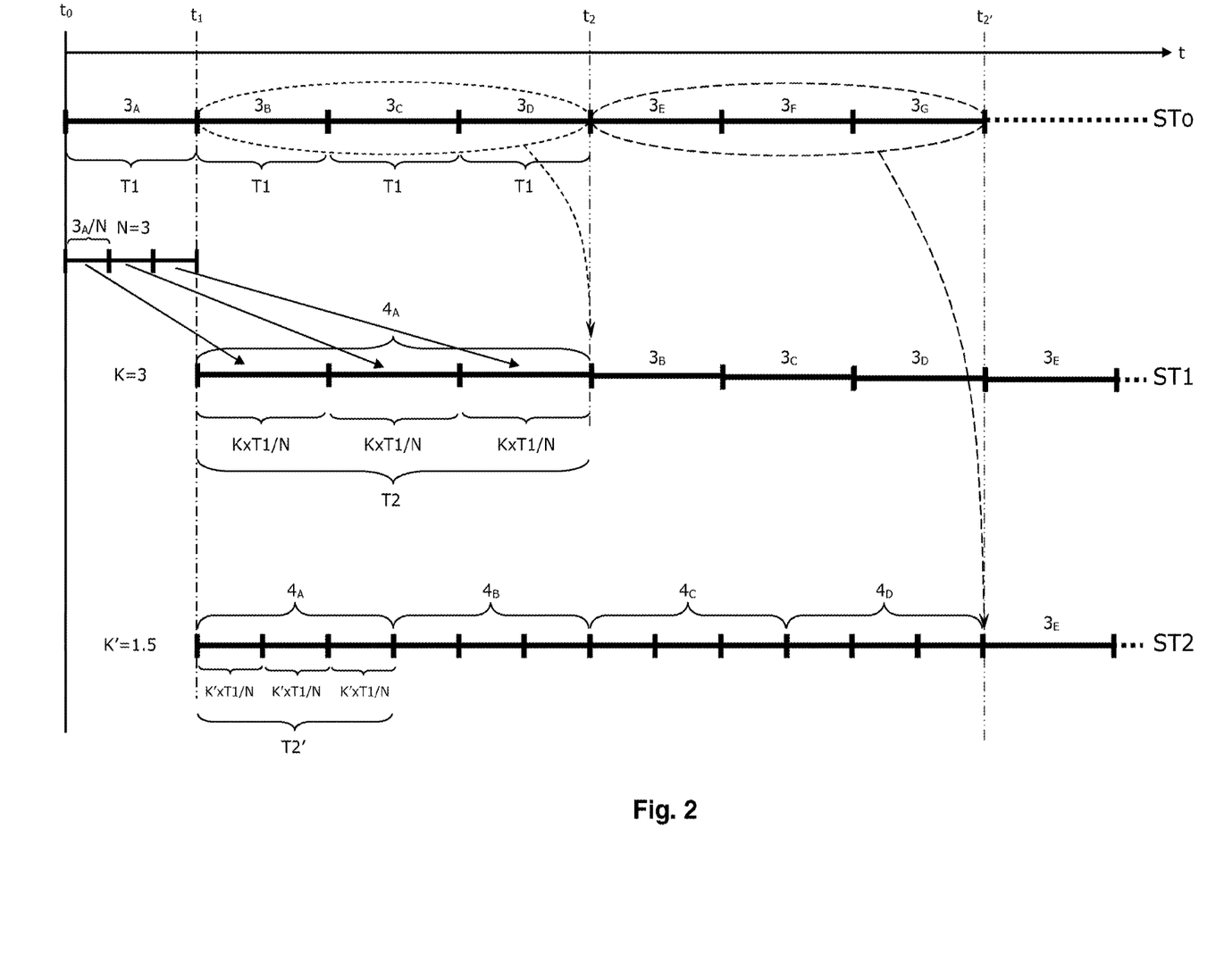
FIG. 2 is a diagram showing two scenarios illustrating one embodiment for rendering segments pertaining to a streaming content.

FIG. 2 discloses a diagram wherein an original stream STo is depicted together with two streams ST1, ST2 in relation to a time line t which has a time origin at the instant to. In this example, all of these streams STo, ST1 and ST2 represent media content transmitted through a live streaming process. The original stream STo represents the streaming content 13 as it is usually provided by the local access point 40. Each of the streams ST1 and ST2 represents the program stream as it might be output from the local access point and sent to the client device. The time origin to corresponds to the moment when the content enters into the local access point. In order to make a clear distinction between successive regular segments 3 provided by the local access point, these have been identified by the reference numerals 3A, then 3s, 3c, 3o, etc. . . . . . The first time, t1, corresponds to the length of a regular segment which is also the time required by the local access point to fully download content for forming the first regular segment 3A. In accordance with a preferred embodiment of the invention, this time also corresponds to the so-called first buffering period. In this example, the payload carried in each regular segment 3A, 3s, 3c, 3o, etc. . . . has the same first playback duration T1. Still according to this example, the local access point is configured to generate a set 4 of N=3 particular segments, from a single regular segment 3. In addition, each of these particular segments represents the same duration, namely one third of T1.

Again referring to FIG. 2, specifically to the stream represented by ST1, the local access point is configured to split the first regular segment 3A into a set 4A of three particular segments. The set 4A represents a second playback duration T2 which is three times longer than the first playback duration T1. Accordingly, the local access point applies a factor K=3, resulting in a slowdown rate of 3, for extending the first playback duration of the regular segment, so as to obtain the second playback duration of the corresponding set of singular segments. Once sufficient content has been downloaded by the local access point to form the first regular segment 3A, the local access point generates the required three particular segments and transmits them to the client device. Advantageously, the client device is therefore able to successively playback the payload carried by each of these particular segments at an early time, roughly at the first time k.

During the playback of the three particular segments comprised in the set 4A, namely during the time interval comprised between t1 and t2, the client device simultaneously buffers the next segments transmitted by the local access point, namely the three successive regular segments 3s, 3c, 3o. Accordingly, at the instant t2, the client device has buffered a large enough playback duration (in this case 3×T1) which can then be regularly released towards the rendering device. Accordingly, the initial buffering period during which the end user has to wait until the predetermined number of segments has been loaded in the buffer of the client device is reduced from 3×T1 to T1. By considering that each regular segment represents a playback duration equivalent to 15 seconds, 30 seconds are advantageously saved in the time interval required until the first frame can be displayed on the rendering device.

Referring once more to FIG. 2, specifically to the stream represented by ST2, the factor K used to extend the first playback duration T1 to the second playback duration T2' has been reduced to K'=1.5. Accordingly, the sets 4A, 4s, 4c, 4o are generated instead of providing the four successive regular segments 3A, 3s, 3c, 3o. The local access point generates the corresponding sets 4A, 4s, 4c, 4o until the client device has buffered the same number of regular segments as in the first variant (ST1), namely the segments 3E, 3F, 3G.

As the first buffering period is identical in the two variants (ST1, ST2), the end user has the same advantage in terms of waiting times. However, during the time interval comprised between t1 and t2 (first transitional period), the visual experience provided by the first stream ST1 will be altered more than that provided by the second stream ST2 during the time interval comprised between t1 and t2 (second transitional period). Indeed, and as shown in FIG. 2, the set 4A of the second stream ST2 is closer to the original segment 3A than the set 4A of the first stream ST1. From a visual point of view, this means that the first stream ST1 will seem to be rendered at a slower rate than the second stream ST2 during the respective transitional periods.

Several techniques can be used during the pre-processing operation 43 for extending the first playback duration T1 to the second playback duration T2 (T2').

According to one embodiment and as shown as example in FIG. 2, the second playback duration T2 can be obtained by modifying or applying a factor K, representing a slowdown rate, to at least one timestamp defined within the streaming content 13, for instance within the segments or within the frame-headers. The timestamp is used for specifying when and/or for how long the segments or the frames must be rendered by the client device. Typically, such a timestamp will refer to the Presentation Time Stamp (PTS).

According to another embodiment, the second playback duration T2 can be obtained by consecutively rendering elementary entities of this payload several times or at least two times. An elementary entity can be for instance a frame of a GOP or an audio frame i.e. an audio sample. Such a consecutive rendering (or re-use) of elementary entities of the payload can be achieved according to different techniques.

A first technique could be to merely replay these elementary entities. For instance, all or part of the frames contained in a GOP could be consecutively replayed twice or three times before playing the next frame of this GOP. Of course, such a way could be applied to several consecutive GOPs. Replaying the frames could be implemented through a specific instruction (or a parameter) that could be included into the header of the frame or into another header such as the header of the GOP for instance.

A second technique for rendering consecutive elementary entities could be to perform at least once the following steps applied to the payload:

duplicating one elementary entity so as to obtain a copy, and inserting this copy next to the duplicated elementary entity in said payload.

Preferably, these steps will further include an initial step for decoding the input stream, and a final step for encoding this stream so as to form the particular segment 5.

For example, if an original GOP contains the following sequences of frames: I1-B2-B3-P4-B5-85-P7, duplicating one frame (e.g. B3) to obtain a copy (83') and inserting the copy next to the duplicated frame may result to the following new sequence: I1-B2-83-83'-P4-B5-85-p7_ Then, by applying a second round to this new sequence, one can obtain the following final sequence: I1-B2-B3-83'-P4-B5-85'-B5-p7_ It should be noted that such a process is not limited to the copying of B-frames and, of course, could comprise more than two rounds.

A third embodiment suitable for obtaining the second playback duration T2 could be to perform at least once the following steps applied to the payload:
  calculating at least one additional elementary entity, compliant with the payload, on the basis of two consecutive elementary entities of this payload, and
  inserting this at least one additional elementary entity between the aforementioned two successive elementary entities.

As mentioned above, preferably these steps will further include an initial step for decoding the input stream, and a final step for encoding this stream so as to form the particular segment 5.

Accordingly, additional frames determined by a calculation process could be inserted within the sequence of frames, instead of performing copies of frames. Still referring to the above-mentioned example of sequence, the frame 83' and/or B6' could result from a calculation based on frames B3 and P4, respectively B5 and B6. According to one embodiment, the aforementioned calculation process may relate to an interpolation based on the two consecutive frames. Such an interpolation could be determined by a weighted average of pixel values referring to a same area within these two consecutive frames. This weighted average could be determined e.g. thanks to the motion vectors. Making an additional frame determined by an interpolation method would advantageously provide a better rendering, while preventing the "step" effect resulting from the first and second techniques during the playback of the event.

According to the embodiments taken as examples in the present description, the payload relates to a video content and the elementary entities correspond to frames of this video content. However, this payload could relate to another kind of media content, such as audio or audio and video content and these elementary entities could refer to any kind of samples of this media content.

In one embodiment, each of the segments is carried within a content file (especially a short content file) compliant with the HTTP Live streaming protocol, also known as being the HLS protocol.

Figure 3:
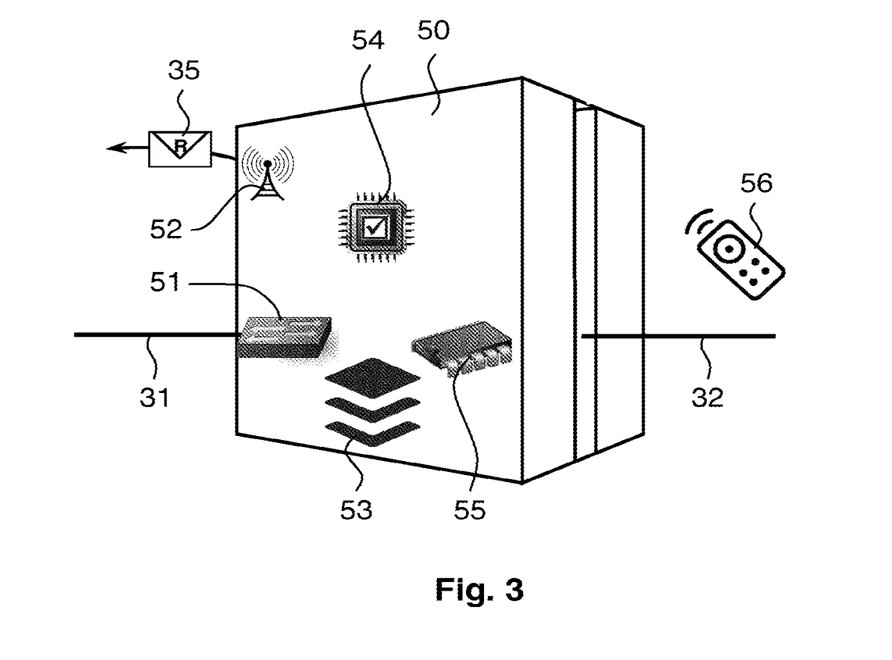
FIG. 3 is a more detailed schematic illustration of the client device of the system shown in the architecture of FIG. 1.
Figure 4:
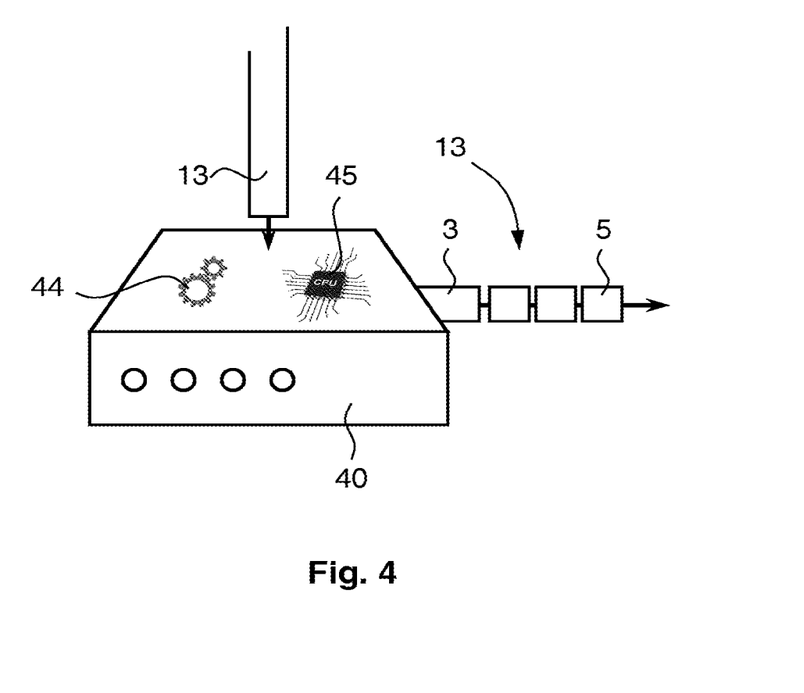
FIG. 4 is a more detailed schematic illustration of an access point, in particular a local access point such as a gateway, suitable for implementing the methods and the systems disclosed herein.

While referring to FIGS. 1, 3 and 4, the present disclosure also concerns a system for implementing any of the embodiments or techniques of the above-described method.

According to a first particular embodiment, the system comprises an access point, preferably a local access point 40 such as a gateway, which is connectable to a client device 50 for initiating a transmission of streaming content 13 to be rendered on a rendering device 60 for instance. Within a local environment, the streaming content 13 is delivered from the local access point 40 to the client device 50. As shown in FIG. 1, content transmitted through the first communication link 31 is structured as a plurality of regular segments 3 relating to a single event. Each of these segments carries a payload, namely a portion of a single event. Each segment, or more specifically each payload of such a regular segment, represents a first playback duration T1, in particular when the payload is rendered by the client device at a nominal speed.

Referring more particularly to FIG. 3, the latter discloses a schematic illustration of the client device 50. As shown in this Figure, the client device might comprise:
  an interface 51 that is used at least for receiving the streaming content 13 through the first communication link 31; said first communication link 31 being the connection: local access point—client device;
  a communication unit 52 for sending at least a request 35 to the local access point 40, this request 35 can be regarded as being an instruction, sent at least to the local access point for receiving the streaming content 13, in particular for receiving a first streaming content or a second streaming content in the case where a first streaming content is currently received by the client device;
  an actuator 56 configured to initiate the request 35;
  a buffer 53 for stacking a plurality of segments 3 of the streaming content 13 during a first buffering period;
  a checking means or a checking unit 54 for checking that the pre-determined number of segments (i.e. chunks) have been duly buffered in accordance with a prerequisite imposed by the client device; the prerequisite must be fulfilled in order to trigger the rendering of the event, in particular the rendering of the payload contained in the first segments 3 of the streaming content 13;
  a controller 55 suitable for rendering the event, in particular the payload carried by the segments 3, 5, of the streaming content 13; said rendering being performed at the nominal speed, e.g. in view to be played on the rendering device 60.

The interface 51 and the communication unit 52 could be the same entity. As illustrated in FIG. 3, the request 35 is sent to the local access point 40 through a different way than the first communication link 31. However, the same communication means (between the local access point 40 and the client device 50) could be used, both for receiving the streaming content 13 and for sending the request 35.

The request 35 sent by the client device 50 to the local access point 40 could be forwarded by the latter to the content provider 10.

The local access point 40 of the above-described system comprises a processing unit 45 (FIG. 4) which is configured to perform the pre-processing operation 43 (FIG. 1) for delivering at least one set 4 of particular segments 5, instead of one or more regular segments 3. More specifically, through its pre-processing operation 43, the processing unit 45 is configured to generate, from each of said at least one regular segment 3, a set 4 of particular segments 5. The payload of this set 4 represents a second playback duration T2 which is greater than the first playback duration T1. Preferably, the payload of the set 4 of particular segments 5 has a rendering intelligibility which is equivalent to that of the payload of the corresponding regular segment 3. The sense of this rending intelligibility being the same as that discussed regarding the corresponding method.

In one embodiment, the local access point further comprises a transcoder 44 for decoding the input streaming content 13 and re-encoding it in accordance with a coding format that is supported by the client device 50. Preferably, this transcoder 44 is further configured to perform the pre-processing operation 43 between the decoding step and the re-encoding step.

As already mentioned, the streaming content, in particular the segments and/or the elementary entities (e.g. frames or samples) may further comprise at least one timestamp, typically located within a header. Such a timestamp aims to specify when and/or for how long the related payload must be rendered by the client device. The processing unit can be further configured to modify such a timestamp, or to apply a slowdown factor K to such a timestamp, in order to obtain the aforementioned second playback duration T2. Preferably, such a slowdown factor K would be typically in a range comprised between 1 and 3 so as to obtain an acceptable slowdown playback.

According to a further embodiment, the processing unit 45 can further comprise means for consecutively rendering at least two times elementary entities of the payload, for instance as already described with regard to the method. Accordingly, the processing unit 45 could comprise means for playing some elementary entities more than one time, i.e. without providing any modification to the payload. Playing a same frame, or a sample, at least two times could be carried out through a specific instruction that could be read by the processing unit 45.

According to a particular variant, the processing unit 45 could be configured for modifying the payload by inserting, at least once, at least one copy of an elementary entity next to this elementary entity (duplication process). According to another variant, the processing unit 45 may be configured to calculate additional elementary entities instead of providing copies as mentioned above. Calculating an elementary entity may be performed on the basis of two consecutive elementary entities, for instance by performing an interpolation based on these consecutives entities as already explained regarding to the method.

According to a second particular embodiment, this system may be used for controlling a client device 50 and the delivery of a streaming content 13 from a local access point 40 to this client device 50. The streaming content 13 is structured as a plurality of regular segments 3 relating to a single event, each of said regular segments 3 carrying a payload of a first playback duration T1. This system comprises a processing configured to process at least one of the regular segments 3 into a set 4 of particular segments 5 where the payload of this set 4 represents a second playback duration T2 greater than that of the first playback duration T1. This processing unit is also configured to transmit, during a first period, from the local access point 40 said set 4 of particular segments 5 to comply with a client device prerequisite requirement for initiating a rendering of the event. Such a system could be for example a software controlled system.

It should be noted that the processing unit of this system can be the same as the processing unit 45 of the local access point which has been disclosed regarding to the first particular embodiment of the system. Accordingly, the same features as those already disclosed regarding the embodiments of this processing unit 45 can be applied to the processing unit of the second particular system.

The local access point 40 which has been described above will now be discussed in further detail. The local access point 40 supports coupling to a client device 50 and is able to initiate a transmission of a program stream 13, e.g. in view of rendering the program stream content on a rendering device 60. This streaming content, as provided by the local access point to the client device, is structured into a plurality of regular segments 3 relating to a single event. Each of these segments carries a payload. This payload, or the regular segment carrying this payload, represents a first playback duration T1.

Generally speaking, the local access point comprises a receiver for receiving a program stream comprising said plurality of regular segments.

The local access point 40 comprises a processor such as a processing unit 45. The processing unit 45 can be comprised of one or more processing devices, e.g. one or more microprocessors, microcontrollers, digital signal processors, etc.) and may comprised a distributed system. Additionally, one or more of the other components of local access point 45 may be implemented by, on, or as a part of the processing unit 45 This processing unit is the same as that previously described regarding the system above and, therefore, it can have the same features as described in the embodiments referring to the description of the system. Accordingly, this processing unit 45 is configured to receive a request from the client device 50 to initiate the transmission of the streaming content 13 from the local access point 40 to the client device 50. This processing unit 45 is further configured to process at least one of these regular segments 3 into a set 4 of particular segments 5 where the payload of said set 4 represents a second playback duration T2 greater than that of the first playback duration T1. In other words, the total payload duration of the set 4 is greater the first playback duration.

To this end, the processing unit 45 could be configured to perform a pre-processing operation 43 for delivering, instead of at least one regular segment 3, at least one set 4 of particular segments 5. More specifically, through its pre-processing operation 43, the processing unit 45 is configured for generating, from said at least one regular segment 3, a set 4 of particular segments 5. The payload of this set 4 represents a second playback duration T2 which is greater than the first playback duration T1 for the same reasons as those already described above. Preferably, the payload of the set 4 of particular segments 5 has an equivalent rendering intelligibility as that of the payload of the corresponding regular segment 3.

As already mentioned, this local access point 40 can further comprise a transcoder 44 for decoding the input streaming content 13 and re-encoding it in accordance with a specific coding format, in particular with a coding format that is supported by the client device 50. Preferably, this transcoder 44 is further configured to perform the aforementioned pre-processing operation 43 between the decoding step and the re-encoding step.

The processing unit 45 can be configured to obtain the second playback duration T2 by any of the techniques already described above.

The access point 40 further comprises a transmitter to transmit the set 4 of particular segments 5 and regular segments 3 of the program stream. According to one embodiment, the transmitter and the receiver can be combined in a transceiver.

Any of the subject-matter of the present invention may be embodied in other specific forms without departing from the spirit of the essential attributes thereof. Therefore, the illustrated embodiments should be considered in all respects as illustrative and not restrictive, reference being made to the appended claims rather than to the foregoing description to indicate the scope of the invention.

The invention claimed is:

1. A method for transmitting a program stream for delivery from a gateway device to a client device, the program stream being structured in regular segments, the method comprising:

processing, by the gateway device, at least one segment into one or more additional segments, wherein a payload of the at least one segment has a first playback duration, in time and a payload of the one or more additional segments has a second playback duration, in time, that is different from the first playback duration, and wherein a number of one or more additional segments is equivalent to a predetermined number of segments that, when added to the at least one segment, cause a client device to initiate a rendering of the program stream; and transmitting the one or more additional segments from the gateway device to the client device.

2. The method of claim 1, wherein said second playback duration is obtained by modifying or by applying a slowdown rate factor to at least one timestamp defined within said program stream.

3. The method of claim 1, wherein said second playback duration is obtained by consecutively rendering, at least twice, elementary entities of the payload of said one or more additional segments.

4. The method of claim 3, wherein consecutively rendering, at least twice, the elementary entities of said payload of the one or more additional segments includes:

duplicating one elementary entity to obtain a copy, and
inserting the copy next to the duplicated elementary entity in said payload of said one or more additional segments.

5. The method of claim 1, wherein said second playback duration is obtained by:

calculating at least one additional elementary entity, compliant with said payload of the one or more additional segments, based on two consecutive elementary entities of the payload of the one or more additional segments, and
inserting the at least one additional elementary entity between said two successive elementary entities of said payload of the one or more additional segments.

6. The method of claim 5, wherein the additional payload elementary entity results from an interpolation of the two successive elementary entities.

7. The method of claim 1, wherein the one or more additional segments carries a payload which represents a playback duration equal to the first playback duration.

8. The method of claim 1, wherein the payload of the one or more additional segments relates to video content or audio-video content and said elementary entity is a frame of said video or audio-video content.

9. The method of claim 1, wherein the at least one segment is carried by content files compliant with an adaptive live streaming protocol.

10. The method of claim 1, wherein modifying the program stream is performed, by the gateway device, between a decoding operation and an encoding operation of the program stream, the operations being carried out before the rendering of the program stream.

11. A gateway device that supports coupling to a client device and that transmits a program stream structured in segments, comprising:

a transmitter; and
a processor configured to
process at least segment into one or more additional segments, wherein the at least one segment carries a payload of a first playback duration, in time, and wherein a payload of the one or more additional segments represents a second playback duration, in time, different from the first playback duration, wherein a number of the one or more additional segments is at least equivalent to a predetermined number of segments that, when added to the at least one segment, cause the client device to initiate a rendering of the program stream; and
output the one or more additional segments via the transmitter to the client device.

12. The gateway device of claim 11, wherein the program stream further comprises at least one timestamp and the processor is further configured to modify said timestamp or to apply a slowdown rate factor to the timestamp to obtain the second playback duration.

13. The gateway device of claim 11, wherein the processor is further configured to consecutively render, at least twice, elementary entities of the payload of the one or more additional segments to obtain the second playback duration.

14. The gateway device of claim 13, wherein the processor is further configured to modify the payload of the one or more additional segments by inserting, at least once, at least one copy of an elementary entity next to the elementary entity.

15. The gateway device of claim 11, wherein each of the one or more additional segments carries payload which represents a playback duration equal to the first playback duration.

16. The method of claim 1, wherein the second playback duration is greater than the first playback duration.

17. The gateway device of claim 11, wherein the second playback duration is greater than the first playback duration.

* * * * *